United States Patent
Choi

(10) Patent No.: US 7,833,124 B2
(45) Date of Patent: Nov. 16, 2010

(54) POWER TRAIN OF AN AUTOMATIC TRANSMISSION FOR A VEHICLE

(75) Inventor: Hyun Seok Choi, Yongin (KR)

(73) Assignee: Hyundai Motor Company, Seoul (KR)

( * ) Notice: Subject to any disclaimer, the term of this patent is extended or adjusted under 35 U.S.C. 154(b) by 491 days.

(21) Appl. No.: 11/949,619

(22) Filed: Dec. 3, 2007

(65) Prior Publication Data
US 2009/0048057 A1   Feb. 19, 2009

(30) Foreign Application Priority Data
Aug. 16, 2007   (KR) ...................... 10-2007-0082376

(51) Int. Cl.
F16H 3/44   (2006.01)
F16H 37/06   (2006.01)
(52) U.S. Cl. ...................... 475/286; 475/330; 475/319; 475/325
(58) Field of Classification Search ................. 475/286, 475/317, 319, 320, 323, 325, 326, 329, 330
See application file for complete search history.

(56) References Cited

U.S. PATENT DOCUMENTS 6,634,980 B1 * 10/2003 Ziemer ...................... 475/275
6,723,018 B2 * 4/2004 Hayabuchi et al. .......... 475/276
6,962,548 B2 * 11/2005 Bucknor et al. ............. 475/276
6,988,972 B2 * 1/2006 Usoro et al. ................. 475/275
7,094,173 B2 * 8/2006 Raghavan et al. ........... 475/276
7,402,119 B2 * 7/2008 Kamada et al. ............. 475/282

FOREIGN PATENT DOCUMENTS

JP        2001082555 A  *  3/2001

* cited by examiner

Primary Examiner—Tisha D Lewis
(74) Attorney, Agent, or Firm—Morgan, Lewis & Bockius LLP

(57) ABSTRACT

A power train of an automatic transmission includes an input shaft connected to a torque converter; an output gear; a transmission case; a first planetary gear set including a first operating member fixedly connected to the input shaft, a second operating member fixedly connected to the transmission case, and a third operating member; a second planetary gear set including a fourth operating member selectively connected to the third operating member, a fifth operating member selectively connected to the input shaft, second or third operating members, a sixth operating member selectively connected to the input shaft or transmission case, a seventh operating member selectively connected to the transmission case, and an eighth operating member acting as an output element, wherein the second planetary gear set outputs ten forward speeds and two reverse speeds; and a plurality of friction members selectively connecting the operating members, input shaft, or transmission case.

7 Claims, 3 Drawing Sheets

FIG. 2

|     | C1 | C2 | C3 | C4 | C5 | B1 | B2 |
|-----|----|----|----|----|----|----|----|
| 1   | ○  |    |    |    |    | ○  |    |
| 2   | ○  |    |    |    |    |    | ○  |
| 3   | ○  |    |    |    | ○  |    |    |
| 4   | ○  | ○  |    |    |    |    |    |
| 5   | ○  |    | ○  |    |    |    |    |
| 6   | ○  |    |    | ○  |    |    |    |
| 7   |    |    | ○  | ○  |    |    |    |
| 8   |    | ○  |    | ○  |    |    |    |
| 9   |    |    |    | ○  | ○  |    |    |
| 10  |    |    |    | ○  |    |    | ○  |
| R-1 |    | ○  |    |    |    | ○  |    |
| R-2 |    | ○  |    |    |    |    | ○  |

POWER TRAIN OF AN AUTOMATIC TRANSMISSION FOR A VEHICLE

CROSS-REFERENCE TO RELATED APPLICATION

This application claims priority to and the benefit of Korean Patent Application No. 10-2007-0082376, filed in the Korean Intellectual Property Office on Aug. 16, 2007, the entire contents of which are incorporated herein by reference.

BACKGROUND OF THE INVENTION (a) Field of the Invention

The present invention relates to a power train of an automatic transmission for a vehicle. More particularly, the present invention relates to a power train of an automatic transmission for a vehicle which realizes ten forward speeds and two reverse speeds.

(b) Description of the Related Art

A typical shift mechanism of an automatic transmission utilizes a combination of a plurality of planetary gear sets. A power train of such an automatic transmission that includes the plurality of planetary gear sets changes rotating speed and torque received from a torque converter of the automatic transmission, and accordingly changes and transmits the changed torque to an output shaft.

It is well known that when a transmission realizes a greater number of shift speeds, speed ratios of the transmission can be more optimally designed and therefore a vehicle can have better fuel mileage and better performance. For that reason, an automatic transmission that enables more shift speeds is under constant investigation.

In addition, with the same number of speeds, features of a power train such as durability, efficiency in power transmission, and size depend a lot on the layout of combined planetary gear sets. Therefore, designs for a combining structure of a power train are also under constant investigation.

Usually, development of a power train using planetary gear sets does not include devising a wholly new type of planetary gear set. To the contrary, it involves how single/double pinion planetary gear sets are combined, and how clutches, brakes, and one-way clutches are disposed to the combination of planetary gear sets such that required shift speeds and speed ratios are realized with minimal power loss.

For a manual transmission, too many speeds cause a driver the inconvenience of excessive manual shifting. However, for an automatic transmission, a transmission control unit automatically executes shifting by controlling the operation of the power train, and therefore more speeds usually implies more merits.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a power train of an automatic transmission for a vehicle, which includes two planetary gear sets, five clutches, and two brakes, and realizes ten forward speeds and two reverse speeds.

According to an exemplary embodiment of the present invention, a power train of an automatic transmission for a vehicle obtains a shift speed by combining two elements of five clutches and two brakes, and can shift by connecting or releasing one element.

Thus, a power train of an automatic transmission for a vehicle according to an exemplary embodiment of present invention may be easily controlled and shift feel may be enhanced.

A power train of an automatic transmission for a vehicle according to an exemplary embodiment of present invention may include: an input shaft connected to a torque converter; an output gear; a transmission case; a first planetary gear set that includes a first operating member fixedly connected to the input shaft, a second operating member fixedly connected to the transmission case, and a third operating member outputting a reduced speed by an operation of the first operating member and the second operating member; a second planetary gear set that includes a fourth operating member selectively connected to the third operating member, a fifth operating member selectively connected to the input shaft and selectively connected to the second operating member or selectively connected to the third operating member, a sixth operating member selectively connected to the input shaft or selectively connected to the transmission case, a seventh operating member selectively connected to the transmission case, and an eighth operating member always acting as an output element, wherein the second planetary gear set outputs ten forward speeds and two reverse speeds to the output gear; and a plurality of friction members selectively connecting the operating members, the input shaft, or the transmission case.

The plurality of friction members may includes a first clutch selectively connecting the fourth operating member and the third operating member, a second clutch selectively connecting the fifth operating member and the third operating member, a third clutch selectively connecting the fifth operating member and the input shaft, a fourth clutch selectively connecting the sixth operating member and the input shaft, a fifth clutch selectively connecting the fifth operating member and the second operating member, a first brake selectively connecting the sixth operating member and the transmission case, and a second brake selectively connecting the seventh operating member and the transmission case.

The first planetary gear set may be a double pinion planetary gear set that includes the first sun gear, the first planet carrier, and the first ring gear as an operating member.

The first sun gear may be the first operating member, the first planet carrier may be the second operating member, and the first ring gear may be the third operating member.

The second planetary gear set may be a compound planetary gear set in a combination of two double pinion planetary gear sets that share a pinion gear in common, and may include the second sun gear, the third sun gear, the second planet carrier, the second ring gear, and the third ring gear as operating elements.

The second sun gear may be the fourth operating member, the third sun gear may be the fifth operating member, the second planet carrier may be the sixth operating member, the third ring gear may be the seventh operating member, and the second ring gear may be the eighth operating member.

The first planetary gear set and the second planetary gear set may be disposed in a sequence of the first planetary gear set and the second planetary gear set from the torque converter, the first, second, and fifth clutches and the first brake may be disposed between the first planetary gear set and the second planetary gear set, and the third and fourth clutches and the second brake may be disposed opposite to the side of the torque converter with respect to the first planetary gear set and the second planetary gear.

The power train of an automatic transmission according to an exemplary embodiment of the present invention may include two planetary gear sets, five clutches, and two brakes, and may realize ten forward speeds and two reverse speeds.

The power train of an automatic transmission according to an exemplary embodiment of the present invention may be combined to obtain a shift speed by two elements of five clutches and two brakes, and can shift by connecting or releasing one element. Thus, a power train of an automatic transmission for a vehicle according to an exemplary embodiment of present invention may be easily controlled and shift feel may be enhanced.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 2 is an operational chart of a power train according to an exemplary embodiment of the present invention.

Figure 1:
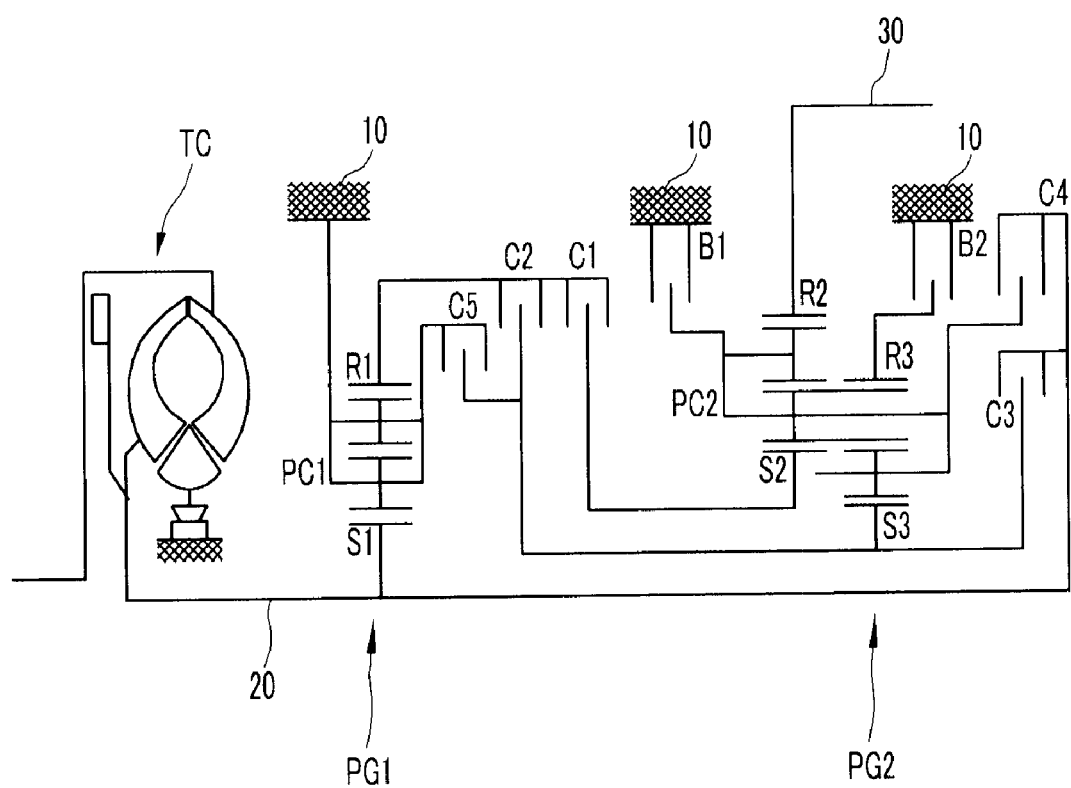
FIG. 1 is a schematic diagram showing a power train according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

FIG. 1 is a schematic diagram showing a power train according to an exemplary embodiment of the present invention.

A power train according to an exemplary embodiment of the present invention includes a first and second planetary gear sets PG1 and PG2 that are disposed on an input shaft 20 that is connected to a torque converter TC.

The first planetary gear set PG1 is a double pinion planetary gear set that includes a first sun gear S1, a first ring gear R1, and a first planet carrier PC1.

The second planetary gear set PG2 is a compound planetary gear set in a combination of two double pinion planetary gear sets that share a pinion gear in common, and includes the second sun gear S2, the third sun gear S3, the second planet carrier PC2, the second ring gear R2, and the third ring gear R3 as operating elements.

The first planetary gear set PG1 and the second planetary gear set PG2 are disposed in a sequence of the first planetary gear set PG1 and the second planetary gear set PG2 from the torque converter TC.

The power train according to an exemplary embodiment of the present invention is provided with first, second, third, fourth, and fifth clutches C1, C2, C3, C4, and C5 and first and second brakes B1 and B2 as operating elements, and connects or releases each operating element according to requested shifting.

The first sun gear S1 is always fixedly connected to the input shaft 20.

The first carrier PC1 is always fixedly connected to a transmission case 10.

The second sun gear S2, interposing the first clutch C1, is selectively connected to the first ring gear R1.

The third sun gear S3, interposing the second, third, and fifth clutches C2, C3, and C5, is selectively connected to the first ring gear R1, the input shaft 20, and the first carrier PC1 respectively.

The second carrier PC2, interposing the fourth clutch C4, is selectively connected to the input shaft 20, or interposing the first brake B1, is selectively connected to the transmission case 10.

The third ring gear R3, interposing the second brake B2, is connected to the transmission case 10.

The second ring gear R2 is connected to an output gear 30.

The first, second, and fifth clutches C1, C2, and C5 and first brake 131 are disposed between the first planetary gear set PG1 and the second planetary gear set PG2, and the third and fourth clutches C3 and C4 and the second brake B2 are disposed opposite to the side of the torque converter TC.

Figure 2:
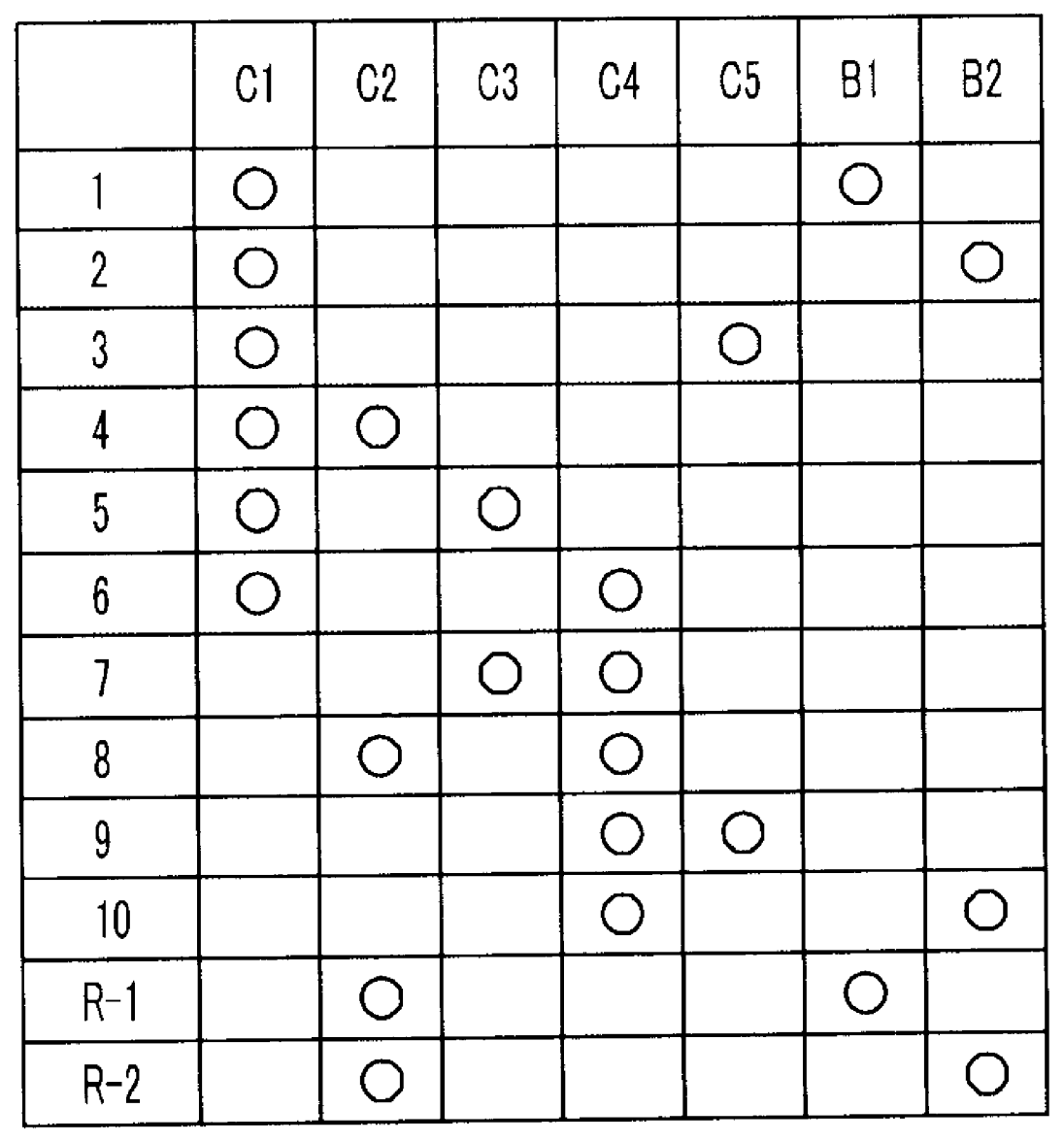

The power train according to an exemplary embodiment of the present invention operates clutches and brakes as shown in FIG. 2, and realizes ten forward speeds and two reverse speeds.

That is, in the first forward speed the first clutch C1 and the first brake B1 are operated, and in the second forward speed the first clutch C1 and the second brake B2 are operated. In the third forward speed the first clutch C1 and the fifth clutch C5 are operated, and in the fourth forward speed the first clutch C1 and the second clutch C2 are operated. In the fifth forward speed the first clutch C1 and the third clutch C3 are operated, and in the sixth forward speed the first clutch and the fourth clutch C4 are operated. In the seventh forward speed the third clutch C3 and the fourth clutch C4 are operated, and in the eighth forward speed the second clutch C2 and the fourth clutch C4 are operated. In the ninth forward speed the fourth clutch C4 and the fifth clutch C5 are operated, and in the tenth forward speed the fourth clutch C4 and the second brake B2 are operated. In the first reverse speed the second clutch C2 and the first brake B1 are operated, and in the second reverse speed the second clutch C2 and the second brake B2 are operated.

Figure 3:
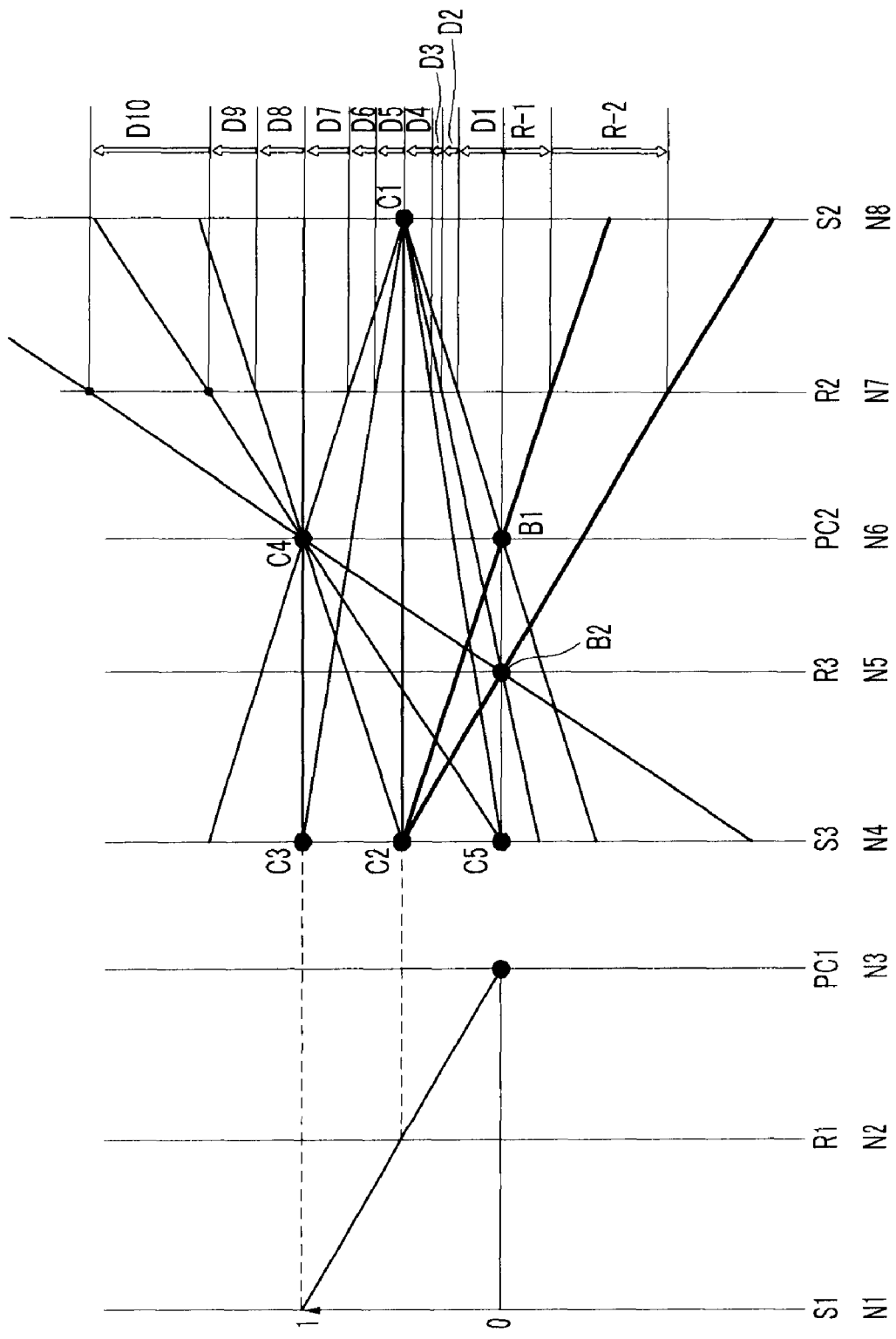
FIG. 3 is a shift diagram of a power train according to an exemplary embodiment of the present invention.

The power train according to an exemplary embodiment of the present invention has eight operational elements as shown in FIG. 3.

A first node N1 is the first sun gear S1, a second node N2 is the first ring gear R1, a third node N3 is the first carrier PC1, a fourth node N4 is the third sun gear S3, a fifth node N5 is the third ring gear R3, a sixth node N6 is the second carrier PC2, a seventh node N7 is the second ring gear R2, and an eighth node N8 is the second sun gear S2.

Hereinafter, referring FIG. 3, shifting operation of the power train according to an exemplary embodiment of the present invention will be explained.

The first clutch C1 and the first brake B1 are operated in the first forward speed.

While the first sun gear S1 of the first node N1 receives the input speed, the third node N3 operates as fixed element by connection to transmission case 10 and the sixth node N6 operate as fixed element by engagement of the first brake B1 and the second sun gear S2 is connected by engagement of the first clutch C1 with the first ring gear R1 and rotates at the same speed as the first ring gear R1. In this case, according to cooperative reaction of the first planetary gear set PG1 and the second planetary gear set PG2, the output element of the seventh node N7 rotates at a speed D1, and the shifting to the first forward speed is realized.

The first clutch C1 and the second brake B2 are operated in the second forward speed.

While the first sun gear S1 of the first node N1 receives the input speed, the third node N3 operates as fixed element by connection to transmission case 10 and the fifth node N5 operate as fixed element by engagement of the second brake B2 and the second sun gear S2 is connected by engagement of the first clutch C1 with the first ring gear R1 and rotates at the same speed as the first ring gear R1. In this case, according to cooperative reaction of the first planetary gear set PG1 and the second planetary gear set PG2, the output element of the seventh node N7 rotates at a speed D2, and the shifting to the second forward speed is realized.

The first clutch C1 and the fifth clutch C5 are operated in the third forward speed.

While the first sun gear S1 of the first node N1 receives the input speed by engagement of the first clutch C1, the third node N3 and the fourth node N4 operate as fixed elements by engagement of the fifth clutch C5, and the second sun gear S2 is connected with the first ring gear R1 and rotates at the same speed as the first ring gear R1. In this case, according to cooperative reaction of the first planetary gear set PG1 and the second planetary gear set PG2, the output element of the seventh node N7 rotates at a speed D3, and the shifting to the third forward speed is realized.

The first clutch C1 and the second clutch C2 are operated in the fourth forward speed.

While the first sun gear S1 of the first node N1 receives the input speed, the third node N3 operates as a fixed element, and the second sun gear S2 and the third sun gear S3 are connected with the first ring gear R1 by engagement of the first clutch C1 and the second clutch C2 respectively and rotate at the same speed as the first ring gear R1. In this case, according to cooperative reaction of the first planetary gear set PG1 and the second planetary gear set PG2, the output element of the seventh node N7 rotates at a speed D4, and the shifting to the fourth forward speed is realized.

The first clutch C1 and the third clutch C3 are operated in the fifth forward speed.

While the first sun gear S1 of the first node N1 and the third sun gear S3 of the fourth node N4 receive the input speed, the third node N3 operates as a fixed element. The second sun gear S2 is connected with the first ring gear R1 by engagement of the first clutch C1 and rotates at the same speed as the first ring gear R1, and the third sun gear S3 is connected with the input shaft 20 by engagement of the first clutch C3 and rotates at the same speed as the input shaft 20. In this case, according to cooperative reaction of the first planetary gear set PG1 and the second planetary gear set PG2, the output element of the seventh node N7 rotates at a speed D5, and the shifting to the fifth forward speed is realized.

The first clutch C1 and the fourth clutch C4 are operated in the sixth forward speed.

While the first sun gear S1 of the first node N1 and the second carrier PC2 of the sixth node N6 receive the input speed, the third node N3 operates as a fixed element. The second sun gear S2 is connected with the first ring gear R1 by engagement of the first clutch C1 and rotates at the same speed as the first ring gear R1, and the second carrier PC2 is connected with the input shaft 20 by engagement of the fourth clutch C4 and rotates at the same speed as the input shaft 20. In this case, according to cooperative reaction of the first planetary gear set PG1 and the second planetary gear set PG2, the output element of the seventh node N7 rotates at a speed D6, and the shifting to the sixth forward speed is realized.

The third clutch C3 and the fourth clutch C4 are operated in the seventh forward speed.

The third sun gear S3 of the fourth node N4 and the second carrier PC2 of the sixth node N6 receive the input speed. The third sun gear S3 and the second carrier PC2 are connected with the input shaft 20 by engagement of the third clutch C3 and the fourth clutch C4 respectively, and rotate at the same speed as the input shaft 20. In this case, according to cooperative reaction of the first planetary gear set PG1 and the second planetary gear set PG2, the output element of the seventh node N7 rotates at a speed D7, and the shifting to the seventh forward speed is realized.

The second clutch C2 and the fourth clutch C4 are operated in the eighth forward speed.

While the first sun gear S1 of the first node N1 and the second carrier PC2 of the sixth node N6 receive the input speed, the third node N3 operates as a fixed element. The third sun gear S3 is connected with the first ring gear R1 by engagement of the second clutch C2 and rotates at the same speed as the first ring gear R1, and the second carrier PC2 is connected with the input shaft 20 by engagement of the fourth clutch C4 and rotates at the same speed as the input shaft 20. In this case, according to cooperative reaction of the first planetary gear set PG1 and the second planetary gear set PG2, the output element of the seventh node N7 rotates at a speed D8, and the shifting to the eighth forward speed is realized.

The fourth clutch C4 and the fifth clutch C5 are operated in the ninth forward speed.

While the second carrier sun gear PC2 of the sixth node N6 receives the input speed by engagement of the fourth clutch C4, the third node N3 and the fourth node N4 operate as fixed elements by engagement of the fifth clutch C5. In this case, according to cooperative reaction of the first planetary gear set PG1 and the second planetary gear set PG2, the output element of the seventh node N7 rotates at a speed D9, and the shifting to the ninth forward speed is realized.

The fourth clutch C4 and the second brake B2 are operated in the tenth forward speed.

While the second carrier sun gear PC2 of the sixth node N6 receives the input speed by engagement of the fourth clutch C1, the fifth node N5 operates as a fixed element by engagement of the second brake B2. In this case, according to cooperative reaction of the first planetary gear set PG1 and the second planetary gear set PG2, the output element of the seventh node N7 rotates at a speed D10, and the shifting to the tenth forward speed is realized.

The second clutch C2 and the first brake B1 are operated in the first reverse speed.

While the first sun gear S1 of the first node N1 receives the input speed, the third node N3 operate as fixed elements by connection to the transmission case 10 and the sixth node N6 operate as fixed elements by engagement of the first brake B1, and the third sun gear S3 is connected with the first ring gear R1 by engagement of the second clutch C2 and rotates at the same speed as the first ring gear R1. In this case, according to cooperative reaction of the first planetary gear set PG1 and the second planetary gear set PG2, the output element of the seventh node N7 rotates at a speed R-1, and the shifting to the first reverse speed is realized.

The second clutch C2 and the second brake B2 are operated in the second reverse speed.

While the first sun gear S1 of the first node N1 receives the input speed, the third node N3 operate as fixed elements by connection to the transmission case 10 and the fifth node N5 operate as fixed elements by engagement of the second brake B2, and the third sun gear S3 is connected with the first ring gear R1 by engagement of the second clutch C2 and rotates at the same speed as the first ring gear R1. In this case, according to cooperative reaction of the first planetary gear set PG1 and the second planetary gear set PG2, the output element of the seventh node N7 rotates at a speed R-2, and the shifting to the second reverse speed is realized.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention, as well as various alternatives and modifications thereof. It is intended that technical spirit and scope of the present invention be defined by the Claims appended hereto and their equivalents.

What is claimed is:

1. A power train of an automatic transmission for a vehicle, the power train comprising:
    an input shaft connected to a torque converter;
    an output gear;
    a transmission case;
    a first planetary gear set that includes a first operating member fixedly connected to the input shaft, a second operating member fixedly connected to the transmission case, and a third operating member outputting a reduced speed by an operation of the first operating member and the second operating member;
    a second planetary gear set that includes a fourth operating member selectively connected to the third operating member, a fifth operating member selectively connected to the input shaft and selectively connected to the second operating member or selectively connected to the third operating member, a sixth operating member selectively connected to the input shaft or selectively connected to the transmission case, a seventh operating member selectively connected to the transmission case, and an eighth operating member always acting as an output element, wherein the second planetary gear set outputs ten forward speeds and two reverse speeds to the output gear; and
    a plurality of friction members selectively connecting the operating members, the input shaft, or the transmission case,
    wherein the plurality of friction members comprise:
        a first clutch selectively connecting the fourth operating member and the third operating member;
        a second clutch selectively connecting the fifth operating member and the third operating member;
        a third clutch selectively connecting the fifth operating member and the input shaft;
        a fourth clutch selectively connecting the sixth operating member and the input shaft;
        a fifth clutch selectively connecting the fifth operating member and the second operating member;
        a first brake selectively connecting the sixth operating member and the transmission case; and
        a second brake selectively connecting the seventh operating member and the transmission case.

2. The power train of the automatic transmission for the vehicle of claim 1, wherein the first planetary gear set is a double pinion planetary gear set that includes the first sun gear, the first planet carrier, and the first ring gear as an operating member.

3. The power train of the automatic transmission for the vehicle of claim 2, wherein the first sun gear is the first operating member, the first planet carrier is the second operating member, and the first ring gear is the third operating member.

4. The power train of the automatic transmission for the vehicle of claim 3, wherein the first planetary gear set and the second planetary gear set are disposed in a sequence of the first planetary gear set and the second planetary gear set from the torque converter;
    the first, second, and fifth clutches and first brake are disposed between the first planetary gear set and the second planetary gear set; and
    the third and fourth clutches and the second brake are disposed opposite to the side of the torque converter with respect to the first planetary gear set and the second planetary gear set.

5. The power train of the automatic transmission for the vehicle of claim 1, wherein the second planetary gear set is a compound planetary gear set in a combination of two double pinion planetary gear sets that share a pinion gear in common, and includes the second sun gear, the third sun gear, the second planet carrier, the second ring gear, and the third ring gear as operating elements.

6. The power train of the automatic transmission for the vehicle of claim 5, wherein the second sun gear is the fourth operating member, the third sun gear is the fifth operating member, the second planet carrier is the sixth operating member, the third ring gear is the seventh operating member, and the second ring gear is the eighth operating member.

7. The power train of the automatic transmission for the vehicle of claim 6, wherein the first planetary gear set and the second planetary gear set are disposed in a sequence of the first planetary gear set and the second planetary gear set from the torque converter;
    the first, second, and fifth clutches and first brake are disposed between the first planetary gear set and the second planetary gear set; and
    the third and fourth clutches and the second brake are disposed opposite to the side of the torque converter with respect to the first planetary gear set and the second planetary gear set.

* * * * *